(12) United States Patent
Davy et al.

(10) Patent No.: US 11,766,940 B2
(45) Date of Patent: Sep. 26, 2023

(54) VEHICLE INTERIOR COMPONENT HAVING ACCENTUATABLE OPERATING ELEMENT AND VEHICLE EQUIPPED WITH SAME

(71) Applicant: Bayerische Motoren Werke Aktiengesellschaft, Munich (DE)

(72) Inventors: Elsa Davy, Munich (DE); Lenja Sorokin, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/790,015

(22) PCT Filed: Dec. 14, 2020

(86) PCT No.: PCT/EP2020/086045
§ 371 (c)(1),
(2) Date: Jun. 29, 2022

(87) PCT Pub. No.: WO2021/136646
PCT Pub. Date: Jul. 8, 2021

(65) Prior Publication Data
US 2023/0039992 A1  Feb. 9, 2023

(30) Foreign Application Priority Data

Jan. 3, 2020 (DE) ...................... 10 2020 100 040.5

(51) Int. Cl.
*B60K 37/06* (2006.01)
*B60Q 3/225* (2017.01)
(Continued)

(52) U.S. Cl.
CPC ............... *B60K 37/06* (2013.01); *B60Q 3/10* (2017.02); *B60Q 3/217* (2017.02); *B60Q 3/225* (2017.02);
(Continued)

(58) Field of Classification Search
CPC ...... B60K 37/06; B60K 2370/28; B60Q 3/10; B60Q 3/233; B60Q 3/225; B60Q 3/252;
(Continued)

(56) References Cited

U.S. PATENT DOCUMENTS

| 2015/0138801 A1* | 5/2015 | Salter ...................... B60Q 3/68 362/510 |
| 2020/0174638 A1 | 6/2020 | Ulrich et al. |

FOREIGN PATENT DOCUMENTS

| DE | 10 2011 114 051 B4 | 3/2013 |
| DE | 10 2012 206 661 A1 | 10/2013 |

(Continued)

OTHER PUBLICATIONS

PCT/EP2020/086045, International Search Report dated Mar. 17, 2021 (Two (2) pages).

(Continued)

*Primary Examiner* — Thomas M Sember
(74) *Attorney, Agent, or Firm* — Crowell & Moring LLP

(57) ABSTRACT

A vehicle interior component includes a first surface, a second surface that is adjacent to the first surface, an edge disposed between the first surface and the second surface, and an operating element where an item of operating information can be input by the operating element. The operating element is disposed adjacent to the edge on the first surface and/or on the second surface and the operating element is nonvisible in an inoperative state and is visible in an operative state.

7 Claims, 4 Drawing Sheets

(51) Int. Cl.
*B60Q 3/233* (2017.01)
*B60Q 3/242* (2017.01)
*B60Q 3/267* (2017.01)
*B60Q 3/70* (2017.01)
*B60Q 3/10* (2017.01)
*B60Q 3/252* (2017.01)
*B60Q 3/217* (2017.01)
*B60Q 3/283* (2017.01)

(52) U.S. Cl.
CPC ............ *B60Q 3/233* (2017.02); *B60Q 3/242* (2017.02); *B60Q 3/252* (2017.02); *B60Q 3/267* (2017.02); *B60Q 3/283* (2017.02); *B60Q 3/70* (2017.02); *B60K 2370/143* (2019.05); *B60K 2370/28* (2019.05); *B60K 2370/345* (2019.05)

(58) Field of Classification Search
CPC ........ B60Q 3/267; B60Q 3/242; B60Q 3/217; B60Q 3/70; B60Q 3/283
See application file for complete search history.

(56) References Cited

FOREIGN PATENT DOCUMENTS

| | | |
|---|---|---|
| DE | 10 2015 111 647 A1 | 2/2016 |
| DE | 10 2014 016 328 B3 | 3/2016 |
| DE | 10 2014 016 323 A1 | 5/2016 |
| DE | 10 2015 212 671 A1 | 1/2017 |
| DE | 10 2016 007 995 A1 | 1/2018 |
| DE | 10 2017 214 426 A1 | 2/2019 |

OTHER PUBLICATIONS

German Search Report issued in German application No. 10 2020 100 040.5 dated Nov. 27, 2020, with Statement of Relevancy (Seven (7) pages).
ISO 4130-1978, "Road vehicles—Three-dimensional reference system and fiducial marks—Definitions", Aug. 15, 1978, (Four (4) pages).

* cited by examiner

VEHICLE INTERIOR COMPONENT HAVING ACCENTUATABLE OPERATING ELEMENT AND VEHICLE EQUIPPED WITH SAME

BACKGROUND AND SUMMARY OF THE INVENTION

The present invention relates to a vehicle interior component having at least one accentuatable operating element and a motor vehicle equipped with same.

A plethora of vehicle interior components are known to be located in vehicle interiors of motor vehicles, of which a large number can be put into operation, changed during operation, and taken out of operation again by operating means. This all results, inter alia, in a presence of vehicle interior components which disadvantageously result in a visual unrest in the vehicle interior, which is not always desired.

It is the object of the present invention to overcome the disadvantage mentioned.

According to the invention, a vehicle interior component is provided, which has a first surface, a second surface adjacent thereto, an edge located between the first surface and the second surface, and an operating means for inputting an item of operating information, and which is distinguished in that the operating means is arranged essentially adjacent to the edge on the first surface and/or the second surface, and the operating means is made essentially nonvisible in an inoperative state and is made visible in an operative state. In other words, the vehicle interior component comprises an operating element which is accentuatable if desired, and can be designed in particular as a sliding switch or rotating switch.

It is to be noted that the terminus "adjacent to the edge" comprises directly neighboring the edge, essentially existing neighboring having a distance from the edge which is induced in particular by manufacturing tolerances, but also an arrangement over the edge. The word "edge" is to comprise here in the meaning of the present invention not only a line in which two surfaces of one or two more or less rigid vehicle interior components meet, but also vehicle interior components manufactured from a soft material, such as in particular a border or fold manufactured from a textile or leather, and other three-dimensional hardware structures in which a height jump is present. The edge also is not necessarily formed sharp, but rather it can also have any other suitable shape, in particular a soft or rounded edge shape.

The operating means advantageously only becomes visible when it is in its operative state, due to which visual calming of the vehicle interior is advantageously achieved per se. The operative state is a state in which the operating means has been put into operation and is therefore ready to operate, and in which the operating means can exert or exerts its operating function intrinsic to it.

In addition, the mentioned calming is also advantageously reinforced in that the operating element is located neighboring an edge providing a certain optical unrest in any case; the operating element thus withdraws visually in relation behind the edge.

Finally, the device according to the invention offers the additional advantage that a user can find the operating element easily by simply touching or feeling the edge, by which his comfort is further improved.

Handling of the device according to the invention, which is particularly simple in an advantageous manner, is enabled in that the operating element is operationally connected to at least one proximity sensor and/or an electronic input means, wherein the operating means assumes the operative state, which also comprises a startup, or the inoperative state upon output of a signal output by the proximity sensor and/or electronic input means. It is to be noted that the term "input means" also comprises those technical means using which optical signals, in particular by cameras, or acoustic signals, in particular by microphones, can be input directly or indirectly to control or regulate the operating means. It is thus advantageously possible to output an item of information, based on a tracking of gaze direction and dwell time of at least one eye on the first surface, the second surface, and/or the edge and/or the vehicle interior component having one, multiple, or all of the above-mentioned elements, to the operating means, in order to put this into the operative state or the inoperative state. Furthermore, it is thus advantageously possible to activate the corresponding operating means by means of speech input, in order to alternately put it into operation, change or not change it during the operation, or put it out of operation.

The accentuation of the operating means of the vehicle interior component according to the invention is advantageously made particularly appealing if a lighting means located on the operating means is provided, which emits light in the operative state and does not emit light in the inoperative state. The lighting means can be designed in particular as an optical fiber, light-emitting diode, or liquid crystal display. Alternatively or additionally, a projection means can be provided for this purpose, which projects light on the operating means in the operative state and does not project light thereon in the inoperative state. Alternatively or additionally, a color-changing smart material or another color-changing means, in particular like an e-ink, can be provided.

In principle, the operating means can have any suitable shape and/or position neighboring the edge. However, particularly easy finding of the operating means is advantageously possible if it extends at least in sections along the edge.

As previously disclosed, a lighting means can be provided on the operating means. Alternatively or additionally, the first surface, the second surface, and/or the edge can at least partially have a geometry and/or texture in the operative state which is different from that in the inoperative state. For this purpose, it can be provided that the first surface, the second surface, and/or the edge is at least partially formed from a smart material or in a shape-changing manner. In addition, the operating means can be operationally connected to an actuator means, which is designed as a gearing means, vibration means, hydraulic adjustment means, or pneumatic adjustment means and performs a deformation of at least one section of the operating means upon assuming the operative state or inoperative state.

The above-mentioned object is also achieved by a motor vehicle which has at least one vehicle interior component of the above-disclosed type.

According to one preferred embodiment, the vehicle interior component is designed as a dashboard, an air outlet, a steering wheel, a center console, an armrest, a circular instrument, a side pocket, a glove compartment, a storage means, a sunshade, an interior light, a handle, a door handle, a vehicle seat, a vehicle interior panel, a roof lining, a parcel shelf, a head rest, a loudspeaker, a vehicle floor, a floormat, a safety belt, a belt buckle, a belt tongue, a vehicle roof frame, a seam, or a fold. However, it is obvious that other components located in the vehicle interior (which is also to include the luggage compartment) and having an edge come into consideration for a design according to the invention.

It is to be noted that advantageously a visibility of an operating means according to the invention can be produced in its operative state in a context-sensitive manner using those conditions in which the motor vehicle is located. For example, if the vehicle interior component is a door handle or a section of a door inside panel located in the vicinity of the door handle, and if the operating means is a means for opening the door, it is thus provided that the corresponding operating means are only set into the operative state when the vehicle is stationary. An operating means for adjusting the volume of a radio or a hands-free system is adequately only put into the operative state when it is detected that an adjustment is desired. The detection can be carried out in particular after a speech input into a suitable means.

A detailed, non-prejudicial, in particular restrictive description of exemplary embodiments of the present invention is carried out hereinafter with reference to the attached figures, which are not to scale.

DETAILED DESCRIPTION OF THE DRAWINGS

Figure 1:
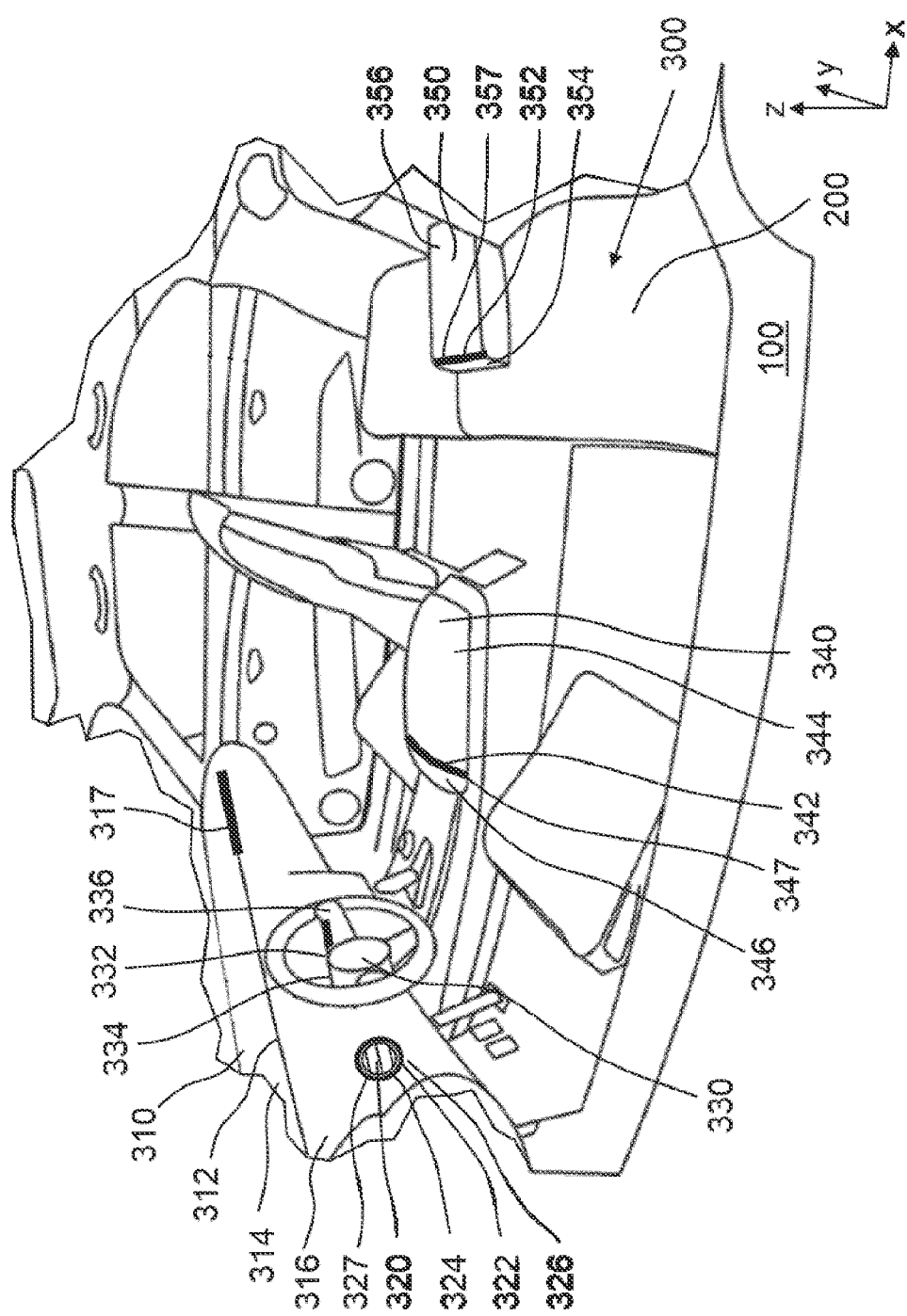
FIG. 1 shows a part of a motor vehicle in a side view, in which an array of vehicle interior components designed according to the invention is located.

FIG. 1 shows a side view of a part of a motor vehicle 100, especially a part of its interior 200. An array of vehicle interior components 300 is located in the interior 200, for example, a dashboard 310, an air outlet 320, a steering wheel 330, a center console 340, and an armrest 350 located in the rear seat bench (which is not shown in greater detail for reasons of clarity).

Each of the mentioned vehicle interior components 300 has at least one edge, at which a first surface and a second surface meet:

The dashboard 310 has an edge 312 extending in the vehicle transverse direction (i.e., in the y direction according to the convention applicable in ISO 4130-1978), at which a first surface 314 forming the upper side of the dashboard 310 and a second side 316 forming a side of the dashboard 310 facing toward a vehicle driver (not shown here) meet.

A circular air outlet 320 is located in the dashboard 310, which has a circular edge 322 at the first surface 324 forming an outer ring and a second surface 326, which is formed in this region by the dashboard 310.

The steering wheel 330 according to the exemplary embodiment shown here has an edge 332 extending in the vehicle transverse direction, at which a first surface 334 forming the upper side of the corresponding spoke and a second surface 336 forming the side of the spoke facing toward the vehicle driver meet.

The center console 340 has an edge 342 facing toward the front direction of the motor vehicle 1, at which a first surface 344 forming a rigid section of the center console 340 and a second surface 346 forming an armrest movable in relation to the first surface 344 meet.

The armrest 350 has an edge 352 facing toward the front direction of the motor vehicle 1 and extending in the vehicle transverse direction, at which a first surface 354 also extending in the vehicle transverse direction and a second surface 356 extending essentially in the vehicle longitudinal direction (i.e., in the x direction according to the convention applicable in ISO 4130-1978) meet.

As can be seen on the basis of the dashboard 310, the air outlet 320, the steering wheel 330, and the armrest 350, the first surface 314, 324, 334, or 354 and the respective second surface 316, 326, 336, or 356 can be connected immovably in relation to one another via the respective edge 312, 322, 332, or 352. It is also possible—as shown on the basis of the center console 340—to provide a relative movement of first surface 344 and second surface 346 in the region of the edge 342. This also applies to the further vehicle interior components, which will not be discussed at this point.

As can be inferred from FIG. 1, an operating means 317 is provided on the right side of the dashboard 310 viewed in the vehicle direction, which is located partially on the first surface 314, on the second surface 316, and over the edge 312 and extends in the vehicle transverse direction. The operating means 317 is designed as an essentially flatly constructed slide control and is operationally connected to a sliding roof (not shown here). In addition, the operating means 317 is connected to a proximity sensor (not shown here) and a lighting means. When the hand of a vehicle occupant (not shown here) moves in the direction of operating means 317, it is thus put in an operative state, in which the lighting means is switched on and the slide control is activated. The lighting means is designed in such a way that additional items of information with respect to an operating position of the sliding roof are displayed. By way of a movement of the hand over the operating means 317 and along the edge 312, it is possible in dependence on the hand movement direction to open, extend, or close the sliding roof. When the hand leaves the region detected by the proximity sensor again, the operating means 317 is put back into its inoperative state.

A further operating means 327 is arranged on the first surface 324 of the air outlet 320, and adjacent to the edge 322, which is designed as a slide control having circular shape. The operating means 327 shown here is operationally connected to a lighting means, a climate control means, and a proximity sensor (each not shown). When a hand of the vehicle occupant approaches the operating means 327 designed in this way, it is put into an operative state in which the lighting means is switched on and the slide control is activated. The lighting means is designed in such a way that additional items of information with respect to a temperature setting of the climate control means are displayed. By way of a movement of the hand over the operating means 327 and along the edge 322, it is possible in dependence on the hand movement direction to set the climate control means, thus, for example, to change the temperature of the air flowing out of the air outlet 320 into the vehicle interior 200 and/or to change its flow speed. When the hand leaves the region detected by the proximity sensor again, the operating means 327 is put back into its inoperative state.

A further operating means 337 is arranged on the second surface 336 of the steering wheel 330 or its spoke and adjacent to the edge 332, which extends as a slide control in the spoke longitudinal direction. The operating means 337 shown here is operationally connected to a lighting means, an entertainment means located in the motor vehicle 1, and a proximity sensor (each not shown). When a hand of the vehicle occupant approaches the operating means 337 designed in this way, it is put into an operative state, in which the lighting means is switched on and the slide control is activated. The lighting means is configured in such a way that additional items of information with respect to a volume control of the entertainment means are displayed. By way of a movement of the hand over the operating means 337 and along the edge 332, it is possible in dependence on the hand movement direction to set the volume of the entertainment means. When the hand leaves the region detected by the proximity sensor again, the operating means 337 is put back into its inoperative state.

A further operating means 347 is arranged on the second surface 346 of the center console 340 and adjacent to the edge 342, which is designed as a slide control. The operating means 347 shown here is operationally connected to a lighting means, a massage means located on the vehicle seat, and a proximity sensor (each not shown). When a hand of the vehicle occupant approaches the operating means 347 designed in this way, it is put into an operating state in which the lighting means is switched on and the slide control is activated. The lighting means is configured in such a way that additional items of information with respect to a massage strength of the massage means are displayed. It is possible by way of a movement of the hand over the operating means 347 and along the edge 342 in dependence on the hand movement direction to set the massage means, to change the intensity of a massage, and to turn off the massage means. When the hand leaves the region detected by the proximity sensor again, the operating means 327 is put back into its inoperative state.

A further operating means 357 is arranged on the second surface 356 of the armrest 350 and adjacent to the edge 352, which is also designed as a slide control. The operating means 357 shown here is operationally connected to a lighting means, an illumination means for the rear region of the motor vehicle 100, and a proximity sensor (each not shown). When a hand of the vehicle occupant approaches the operating means 357 designed in this way, it is put into an operative state in which the lighting means switches on and the slide control is activated. The lighting means is configured in such a way that additional items of information with respect to the luminance of the lighting means are displayed. By way of a movement of the hand over the operating means 357 and along the edge 352 it is possible in dependence on the hand movement direction to turn on the illumination means, control its luminance, or turn it off. When the hand leaves the region detected by the proximity sensor again, the operating means 357 is put back into its inoperative state.

It is to be noted once again at this point that the operating means 317, 327, 337, 347, and 357 are essentially not recognizable when they are outside their respective operative state. Therefore, all operating means 317, 327, 337, 347, and 357 shown in FIG. 1 are in their operative state, since they stand out in a visually prominent manner in relation to the respective first surfaces 314, 324, 334, 344, and 354 and second surfaces 316, 326, 336, 346, and 356 due to their respective lighting means.

Figure 2A:
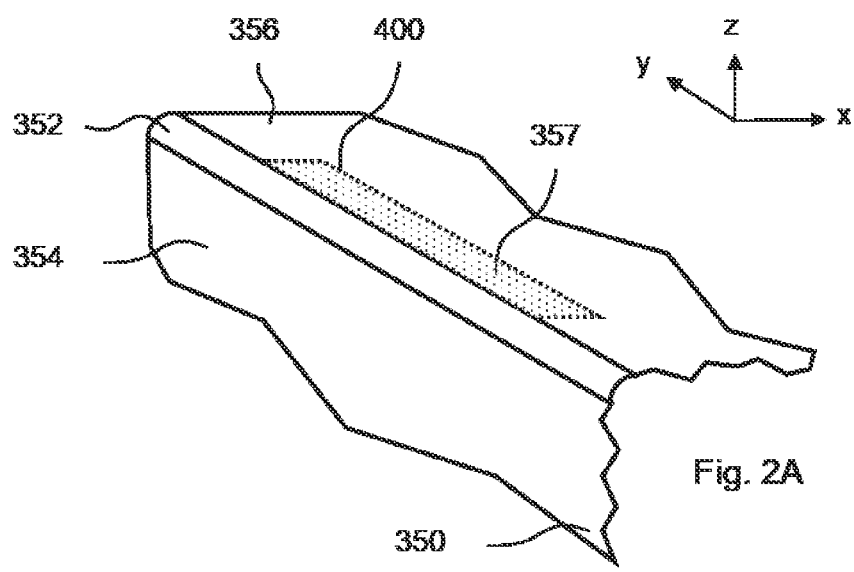
FIG. 2A shows a perspective top view of a part of a vehicle interior component according to the invention designed as a center console in an inoperative state.
Figure 2B:
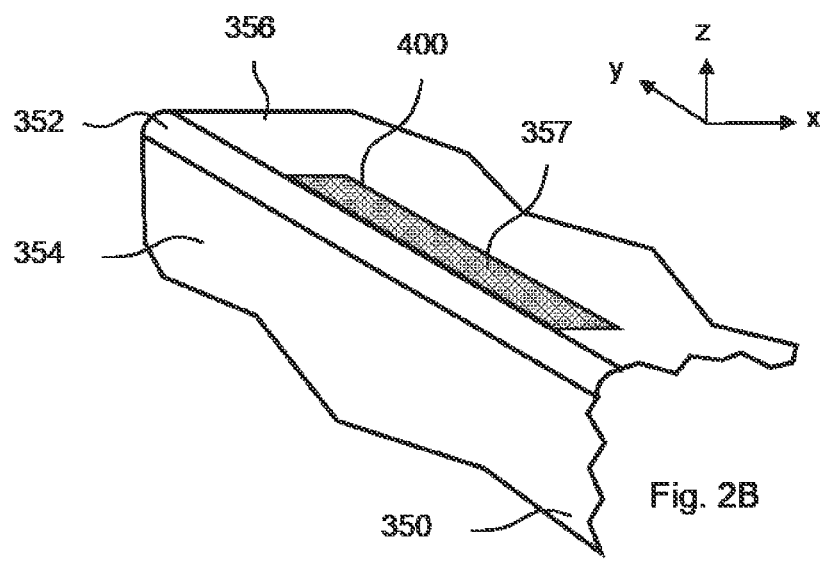
FIG. 2B shows the vehicle interior component shown in FIG. 2 in an operative state.

This circumstance is illustrated once again in each of following FIGS. 2A and 2B on the basis of an enlarged perspective view of the armrest 350: as can be seen from FIG. 2A, the operating means 357 is quasi-unrecognizable in its inoperative state, since it has a concealment means 400 visually equivalent to the second surface 356 of the armrest 350 on its visible side. In contrast, if it is in its operative state, light can thus pass through the concealment means 400 and the operating means 357 is easily recognizable, as can be inferred directly from FIG. 2B.

Figure 3A:
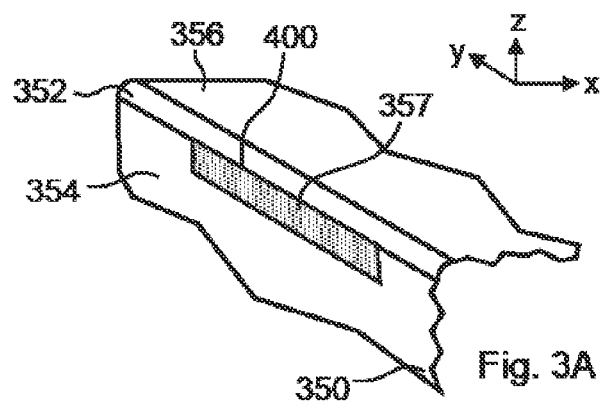
FIG. 3A shows an alternative embodiment of a vehicle interior component to the embodiment shown in FIG. 2A.
Figure 3B:
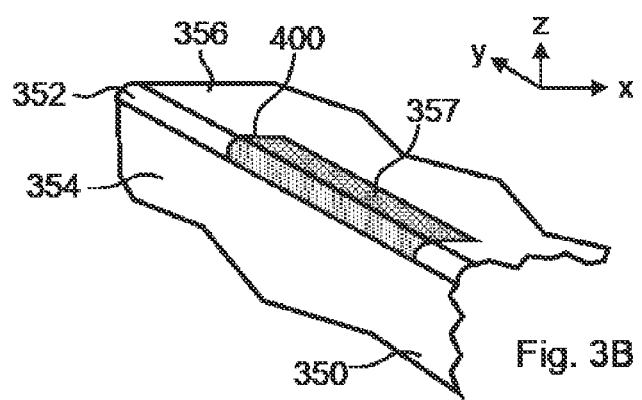
FIG. 3B shows an alternative embodiment of a vehicle interior component to the embodiments shown in FIGS. 2B and 3A.
Figure 3C:
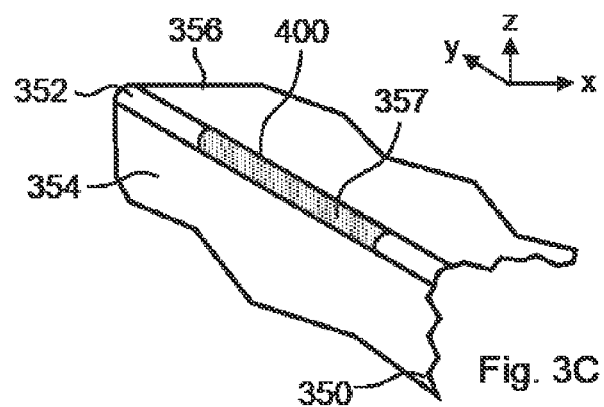
FIG. 3C shows an alternative embodiment of a vehicle interior component to the embodiments shown in FIGS. 2B to 3B.

The operating means 357 shown in FIGS. 2A and 2B is located adjacent to the edge 352 on the second surface 356. However, this is not necessarily the case. Rather, as can be inferred from FIGS. 3A to 3C, the operating means 357 of the edge 352 can also be positioned at the first surface 354 (FIG. 3A), on the first surface 356 and the edge 352 itself (FIG. 3B), or solely on the edge 352 (FIG. 3C).

Figure 4A:
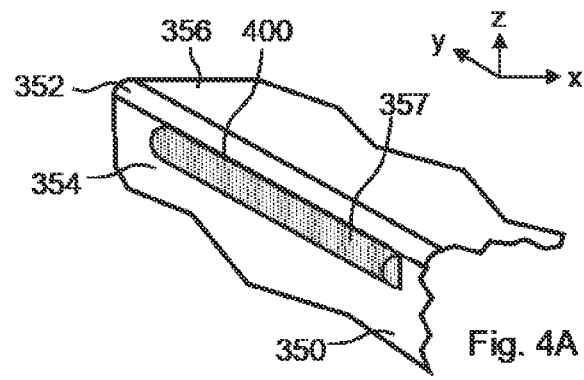
FIG. 4A shows an alternative embodiment of a vehicle interior component to the embodiments shown in FIGS. 2B to 3C.

The operating means 317, 327, 337, 347 and 357 illustrated in the preceding exemplary embodiments would be formed essentially flat essentially both during the inoperative state and also during the operative state. However, this is not necessarily the case. Rather, multiple or all operating means 317, 327, 337, 347, and 357 can be formed flat in their inoperative state, but prominently protruding from the first surface 354 and/or the second surface 356 in their operative state, as can be inferred from FIGS. 4A to 4C:

In FIG. 4A, an operating means 357 of the edge 352 located in its operative state is shown adjacent to the first surface 354 of the armrest 350. The operating means 357 is operationally connected to a pneumatic means (not shown here), which fills the operating means 357 with air upon assuming the operative state or removes the air when the inoperative state is to be assumed again. The operating means 357 thus changes its essentially flat form during the inoperative state into an essentially bead-like form extending along the edge 352, due to which it can easily be found by a hand (not shown) using the operating means 357.

Figure 4B:
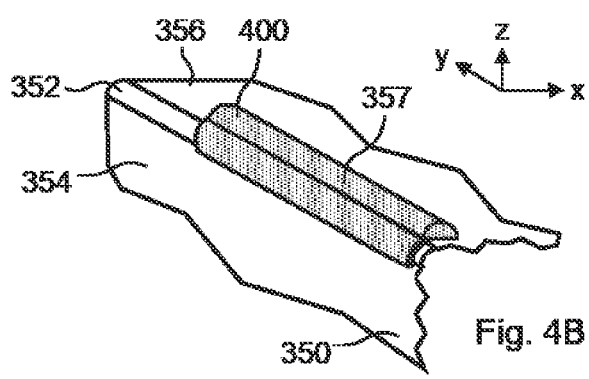
FIG. 4B shows an alternative embodiment of a vehicle interior component to the embodiments shown in FIGS. 2B to 4A.

An alternative embodiment to FIG. 4A is shown in FIG. 4B, in which the operating means 357 has a section located on the edge 352 and a section located on the second surface 356, which can be filled with air due to a pneumatic means (not shown here), in order to each assume an essentially bead-like form during the operative state.

Figure 4C:
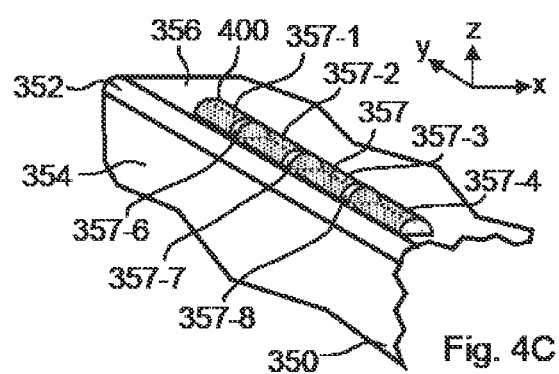
FIG. 4C shows an alternative embodiment of a vehicle interior component to the embodiments shown in FIGS. 2B to 4B.

A further embodiment alternative thereto is shown in FIG. 4C. The operating means 357 extending along the edge 352 on the second surface 356 is divided into multiple subsections 357-1, 357-2, 357-3, and 357-4 arranged adjacent to one another, which are filled with air during the assumption of the operative state individually with the aid of a pneumatic means (not shown here). The subsections 357-1, 357-2, 357-3, and 357-4 are spaced apart from one another here so that their respective lateral surfaces, of which only the lateral surfaces 357-6, 357-7, and 357-8 are shown for reasons of clarity, become visible. The lateral surfaces 357-6, 357-7, and 357-8 have a different color, for example a signal color, than the remainder of the operating means 357, due to which it is easy for a user to identify the latter as a whole not only due to the change of its surface formation, but also due to its coloration.

It is to be noted that the features of the respective embodiments described with reference to FIGS. 2A to 4C can also be used individually or their entirety in the other vehicle interior components 300 mentioned with reference to FIG. 1. It is thus possible in particular to design one, multiple, or all of the vehicle interior components 300 having both a lighting means and also a pneumatic means. Furthermore, it is possible instead of a pneumatic means, to form the respective operating means 317, 327, 337, 347, and 357 from a shape-changing smart material, which is operationally connected to a control means (not shown) and changes its shape in a desired manner, for example, due to an electrical pulse.

LIST OF REFERENCE CHARACTERS

100 passenger vehicle
200 interior
300 vehicle interior components
310 dashboard
312 edge of the dashboard
314 first surface of the dashboard
316 second surface of the dashboard
317 operating means
320 air outlet
322 edge of the air outlet
324 first surface of the air outlet
326 second surface
327 operating means
330 steering wheel
332 edge of a spoke
334 first surface of the spoke
336 second surface of the spoke
337 operating means
340 center console
342 edge of the center console
344 first surface of the center console
346 second surface of the center console
347 operating means
350 armrest
352 edge of the armrest
354 first surface of the armrest
356 second surface of the armrest
357 operating means
357-1 subsection
357-2 subsection
357-3 subsection
357-3 subsection
357-6 lateral surface
357-7 lateral surface
357-8 lateral surface
400 concealment means
x, y, z coordinates of a vehicle-intrinsic coordinate system according to ISO 4130-1978

What is claimed is:

1. A vehicle interior component, comprising:
    a first surface;
    a second surface, wherein the second surface is adjacent to the first surface;
    an edge disposed between the first surface and the second surface; and
    an operating element, wherein an item of operating information can be input by the operating element;
    wherein the operating element is disposed adjacent to the edge on the first surface and/or on the second surface;
    wherein the operating element is nonvisible in an inoperative state and is visible in an operative state;
    wherein the operating element is operationally connected to a proximity sensor and/or an electronic input means and wherein the operating element assumes the inoperative state or the operative state upon output of a signal output by the proximity sensor and/or the electronic input means;
    wherein the operative state is a state in which the operating element has been put into operation and is therefore ready to operate and in which an operating function intrinsic to the operating element is exertable by the operating element and wherein the inoperative state is a state in which the operating element has not been put into operation and is therefore not ready to operate and in which the operating function intrinsic to the operating element is not exertable by the operating element.

2. The vehicle interior component according to claim 1, further comprising a lighting means disposed on the operating element, wherein the lighting means emits light in the operative state and does not emit light in the inoperative state.

3. The vehicle interior component according to claim 1, further comprising a projection means, wherein the projection means projects light on the operating element in the operative state and does not project light on the operating element in the inoperative state.

4. The vehicle interior component according to claim 1, wherein the operating element extends at least in sections along the edge.

5. The vehicle interior component according to claim 1, wherein the first surface, the second surface, and/or the edge at least partially have a respective geometry and/or a respective texture in the operative state which is different from the respective geometry and/or the respective texture in the inoperative state.

6. A motor vehicle, comprising:
    the vehicle interior component according to claim 1.

7. The motor vehicle according to claim 6, wherein the vehicle interior component is a dashboard or an air outlet or a steering wheel or a center console or an armrest or a circular instrument or a side pocket or a glove compartment or a storage means or a sunshade or an interior light or a handle or a door handle or a vehicle seat or a vehicle interior panel or a roof lining or a parcel shelf or a head rest or a loudspeaker or a vehicle floor or a floormat or a safety belt or a belt buckle or a belt tongue or a vehicle roof frame or a seam or a fold.

* * * * *